United States Patent [19]
Stutz et al.

[11] Patent Number: 5,559,992
[45] Date of Patent: Sep. 24, 1996

[54] APPARATUS AND METHOD FOR PROTECTING DATA IN A MEMORY ADDRESS RANGE

[75] Inventors: Peter Stutz, Hinterkappelen; Daniel Flückiger, Walkringen, both of Switzerland

[73] Assignee: Ascom Autelca AG, Berne, Switzerland

[21] Appl. No.: 2,737

[22] Filed: Jan. 11, 1993

[51] Int. Cl.[6] ............................ G06F 12/14; G06F 12/16; G06F 17/00

[52] U.S. Cl. .............. 395/490; 364/464.02; 364/DIG. 1; 364/246.9; 364/246.6; 365/195; 395/185.03; 395/185.04

[58] Field of Search ..................... 395/425, 490, 395/185.03, 185.04; 371/57.1, 60, 21.1; 365/195, 72, 205; 327/202, 218; 364/464.02

[56] References Cited

U.S. PATENT DOCUMENTS

| | | | |
|---|---|---|---|
| 3,827,029 | 7/1974 | Schlotterer et al. | 395/425 |
| 4,141,068 | 2/1979 | Mager et al. | 395/425 |
| 4,376,299 | 3/1983 | Rivest | 380/23 |
| 4,388,695 | 6/1983 | Heinemann | 395/425 |
| 4,566,106 | 1/1986 | Check, Jr. | 371/68.1 |
| 4,644,494 | 2/1987 | Muller | 395/425 |
| 4,802,117 | 1/1989 | Chrosny et al. | 371/10.1 |
| 4,805,109 | 2/1989 | Kroll et al. | 364/464.02 |
| 4,875,156 | 10/1989 | Tanagawa et al. | 395/490 |

FOREIGN PATENT DOCUMENTS

| | | |
|---|---|---|
| 173249 | 3/1986 | European Pat. Off. . |
| 230658 | 8/1987 | European Pat. Off. . |
| 0512542 | 11/1992 | European Pat. Off. . |
| 3421540 | 1/1986 | Germany . |
| 2184692 | 7/1987 | United Kingdom . |
| 8911134 | 11/1989 | WIPO . |

OTHER PUBLICATIONS

"Microsoft Press® Computer Dictionary"; Microsoft Press, 1991; pp. 19 and 160.

*Primary Examiner*—Eddie P. Chan
*Assistant Examiner*—Reginald G. Bragdon
*Attorney, Agent, or Firm*—Brumbaugh, Graves, Donohue & Raymond

[57] ABSTRACT

A data protection apparatus has chip select logic, a protection circuit and one or more memory devices. The chip select logic is designed so that when protected memory is addressed, more than one selection signal is generated. In this way, a protected memory area may encompass all, or a portion, of one or more memory devices. The additional selection signal is processed by a protection circuit which will interrupt the processor if protected memory is addressed during a write cycle in the absence of a request signal which the processor is programmed to generate just prior to its writing to a protected memory area.

64 Claims, 9 Drawing Sheets

APPARATUS AND METHOD FOR PROTECTING DATA IN A MEMORY ADDRESS RANGE

BACKGROUND OF THE INVENTION

The invention relates generally to the protection of important or critical data in memory devices, and relates particularly to protection of such data in postage meters.

When important information is stored in a computer system it is commonplace to provide security against loss of some or all of the information, for example by making a backup copy of the information. In some systems, however, the information as stored in the system is what must be capable of being relied upon, and the theoretical feasibility of relying on backups is of little or no value. An example of such a system is the electronic postage meter, in which the amount of postage available for printing is stored in a nonvolatile memory. The user should not be able to affect the stored postage data in any way other than reducing it (by printing postage) or increasing it (by authorized resetting activities). Some single stored location must necessarily be relied upon by all parties (the customer, the postal service, and the provider of the meter) as the sole determinant of the value of the amount of postage available for printing. In electronic postage meters that single stored location is the secure physical housing of the meter itself. Within the secure housing one or more items of data in one or more nonvolatile memories serve to determine the amount of postage available for printing.

Experience with modern-day systems employing processors shows that it is advantageous to guard against the possibility of a processor running amok. Generally a processor is expected to execute its stored program and it is assumed the stored program contains no programming errors. Under rare circumstances, however, a processor may commence executing something other than the stored program, such as data. Under other rare circumstances the processor, even though it may be executing the stored program, nonetheless behaves incorrectly due to the incorrect contents of a processor register or a memory location. The former may occur if, for example, the instruction pointer or program counter of the processor changes a bit due to, say, absorption of a cosmic ray. The latter may occur if the contents of the processor register or memory location are changed by that or other mechanisms.

In pragmatic terms it is not possible to prove the correctness of a stored program; testing and debugging of the program serve at best to raise to a relatively high level (but not to certainty) the designer's confidence in the correctness of the code. Nonetheless an unforeseen combination of internal states, or an unforeseen set of inputs, has been known to cause a program that was thought to be fully debugged to proceed erroneously.

For all these reasons in systems where crucial data are stored in what is necessarily a single location under control of a processor running a stored program, it is highly desirable to provide ways to detect a processor running amok and to reduce to a minimum the likelihood of the processor's harming the crucial data. In the particular case of a postage meter, it is desirable that the amount of postage available for printing, also called the descending register, be recoverable by an authorized technician even if the system is completely inoperable from the customer's point of view, even after any of a wide range of possible processor malfunctions.

Numerous measures have been attempted to protect crucial data in such systems as postage meters. In a system having an address decoder providing selection outputs to the various memory devices in the system, it is known to monitor all the selection outputs of the address decoder, and to permit the processor's write strobe to reach certain of the memory devices only if (a) the address decoder has selected one of the certain memory devices, and (b) the address decoder has not selected any memory device other than the certain memory devices.

In another system having an address decoder providing selection outputs to the various memory devices in the system, it is known to monitor the selection outputs associated with certain of the memory devices, and to take a predetermined action if any of the selection outputs is selected for longer than a predetermined interval of time. The predetermined action is to interrupt the write strobe and selection outputs to the certain of the memory devices.

Although these approaches isolate the certain memory devices (typically the devices containing the crucial postage data) upon occurrence of some categories of malfunction, they do little or nothing to cure the malfunction when it is caused by a processor running amok. That is, it is important to distinguish the problems just mentioned from the problem of physical malfunction of a processor or other system component. Simple physical malfunction can be quite rare if conservative design standards are followed and if the system is used in rated ambient conditions, so that the frequency of occurrence of such physical malfunctions can be low. But many of the above-mentioned failure modes are not of a lasting physical nature and, if appropriately cleared, need not give rise to permanent loss of functionality.

It is also well-known to provide "watchdog" circuits in computerized systems. In such a system the code executed by the processor includes periodic issuance of a watchdog signal which serves to clear a watchdog circuit. If an excessive time passes without receipt of the watchdog signal, the watchdog circuit takes protective action such as shutting down the system or resetting the processor, The latter action has the advantage that it may restore normal processor function if, for example, the malfunction was due to a spurious change in the value of the instruction pointer or program counter. But the watchdog circuit only triggers after the passage of a predetermined interval, and processor malfunction could conceivably alter crucial data during the predetermined interval and prior to a watchdog-induced reset.

In another memory protection system, a "window" circuit is provided at the memory device inputs. The window circuit couples the write strobe output of the processor to the write strobe input of the memory device upon receiving a setting signal from the processor and decouples the write strobe output of the processor from the write strobe input of the memory device either upon receiving a clearing signal from the processor or upon a counter reaching a predetermined threshold, whichever occurs first. As in the watchdog circuit, this system allows the possibility of the processor altering crucial data in the time interval between the coupling and decoupling of the write strobe.

In the typical prior art memory addressing system of FIG. 1, a processor 10 is capable of writing data to memory devices 11, 12, and 13 by means of a system bus 19, of which address bus 14 and write strobe line 15 are shown. Some of the address lines of address bus 14 are provided to a conventional address decoder 16, these so-called "high-order" address lines are shown as the high-order portion 17 of the address bus. The so-called "low-order" portion 18 of the address bus 14 is provided to memory devices 11, 12, and 13, and to other devices in the memory space of processor 10. For clarity, the data lines and other control lines of the system bus 19 are omitted from FIG. 1, as are the other devices on the system bus, such as keyboard, display, read-only memory and printer.

In the prior art system of FIG. 1 the write strobe signal WR from the processor 10 is provided by a line 15 to the write strobe inputs 21, 22, 23 of the memory devices 11, 12, and 13, respectively. Memory device selection signals are provided by select lines 20 running from the address decoder 16 to "chip enable" inputs of the memory devices. For example, select lines 31, 32, and 33 provide respective select signals to corresponding chip enable inputs 41, 42, and 43 of the memory devices 11, 12, and 13, respectively.

A line 34 from address decoder 16 is indicative generally that the address decoder selects other memory devices than those shown explicitly in FIG. 1. Such memory devices typically include ROM (read-only memory), and memory-mapped input/output devices such as a keyboard, a display, a printer, and discrete input/output latches.

It will be noted that in the system of FIG. 1 the write strobe signal is provided to all memory devices, including 11, 12, and 13, whenever asserted on line 15 by the processor 10. If the processor 10 were misbehaving seriously (as distinguished from the case of a processor or other system component failing in a physical, permanent way) the processor 10 could provide addresses on the address bus 14 that were meaningful to the address decoder 16, enabling one or another of memory devices 11, 12, and 13 from time to time. If the write strobe signal of line 15 were asserted during one of the periods of enablement, the contents of some or all of the memory devices 11, 12, and 13 could be lost. In the case of a postage meter, the descending register contents could be lost, a matter of great concern for both the postal patron and the postal service.

FIG. 2 shows a known prior art system for enhancing the protection of selected memory devices, such as devices 12 and 13, here called "crucial" memory devices. Use of such a system might be prompted by the presence, in memory devices 12 and 13, of important postal data such as descending register data. In such a case memory devices 12 and 13 may be nonvolatile memories. While memory device 11 continues to receive the write strobe signal of line 15, just as in FIG. 1, it will be noted that the crucial memory devices 12 and 13 receive a gated signal 40 at respective write strobe inputs 22 and 23.

With further reference to FIG. 2, the selection outputs 20 of address decoder 16 are connected to respective memory devices as in FIG. 1. The system of FIG. 2 differs, however, in that the selection outputs 20 are also provided to multiple-input AND gate 61. The selection lines 32 and 33 for the crucial memory devices 12 and 13, respectively, are ORed at a gate 65 and provided directly to the AND gate 61. The remaining selection lines from the address decoder 16 are each inverted by inverters 67 and 69, as shown in FIG. 2, and provided to the AND gate 61. The address decoder 16 of FIG. 2 differs from many typical address decoders 16 such as shown in FIG. 1 in that every possible address of the high-order address bus 17 is decoded as one or another of the selection outputs 20. If necessary, a "none-of-the-above" selection output is provided to respond to addresses having no intended physical counterpart in the system design. The result is that the number of selection outputs 20 active at any given moment is exactly one, no more and no fewer.

It will be appreciated that the output 63 of AND gate 61 is high if (a) one of the crucial memory devices is selected and (b) none of the other memory devices is selected. Signal 63 is one of two inputs to AND gate 62; the other is the write strobe signal of line 15. The crucial memory devices, then, receive write strobe signals only when one or another of the crucial memory devices is currently being selected by the address decoder 16.

In the circumstances of a system suffering no mechanical defect, the system of FIG. 2 offers no protection of crucial data beyond that of FIG. 1. Assuming, for example, that the address decoder 16 and the address bus 14 and 17 are electrically intact, then the gates 61 and 62 have no effect. The gates 61 and 62 only serve to block write strobe inputs at 22 and 23 which would in any event be ignored by memory devices 12 and 13 because of the lack of asserted selection signals on lines 32 and 33. Stated differently, a processor 10 misbehaving seriously in a system of FIG. 2 that is electrically sound will be capable of destroying data in the crucial memory devices simply by presenting their addresses on the address bus 14. When the processor 10 presents a valid address on the address bus 14, the corresponding selection line, for example line 32, will be asserted and will be received at the chip-enable input 42 of memory device 12. Likewise, a strobe signal on line 40 will be made available to the write strobe input 22 of memory device 12. The possible result is loss or damage to the contents of memory device 12.

FIG. 3 shows another prior-art system intended to protect data in crucial memory devices, say memory devices 12 and 13. In the system of FIG. 3, the processor 10, address bus 14 and 17, and address decoder 16 are as in FIG. 1. Memory device 11, which is not a crucial memory device, receives the write strobe signal of line 15 directly, as in FIG. 1, and receives its corresponding selection signal 31 directly, also as in FIG. 1.

Crucial memory devices 12 and 13, however, do not receive selection signals or the write strobe signal directly. Instead, AND gates 51, 52, and 53 are provided, blocking the selection signals 32 and 33 and the write strobe signal of line 15 under circumstances which will presently be described.

In the system of FIG. 3, the selection outputs for the crucial memory devices (here, selection signals 32 and 33) are provided to a NOR gate 54. Most of the time the processor 10 is not attempting access to the crucial memory devices 12 and 13, and so select signals 32 and 33 remain unasserted (here assumed to be a low logic level); as a result the output 55 of gate 54 is high. This clears counter 56.

At such time as the processor 10 attempts to read from or write to either of the crucial memory devices 12 or 13, a corresponding one of the selection lines 32 or 33 is asserted. Output 55 of gate 54 goes low, and counter 56 is able to begin counting.

Failure modes are possible in which an address line 32 or 33 may continue to be asserted for some lengthy period of time. For example, a mechanical defect in the address bus 14 and 17, in the address decoder 16, or in the wiring of lines 31, 32, 33, and 34, may give rise to continued selection of a crucial memory device 12 or 13. A consequence of such a mechanical defect could be a write instruction from the processor 10 that is intended for, say, memory device 11, but which, due to the mechanical malfunction, would cause a change in the contents of memory devices 12 or 13 as well.

Although as just described the system of FIG. 3 offers protection against certain mechanical failures, it provides only limited protection against the prospect of a processor misbehaving seriously. As will now be described, the system of FIG. 3 will fail to detect many of the possible ways a processor may misbehave, and will be successful at protecting against only a particular subset of the possible ways of misbehavior.

Those skilled in the art will appreciate that memory read and memory write instructions carried out on the system bus represent only a portion of all the bus activities. Prior to the processor's execution of an instruction forming part of the stored program, the processor must necessarily have fetched the instruction from a memory device on the system bus. From the point of view of an observer of the bus, the fetch activity is electrically very similar to a memory read activity, and each includes a step of the processor 10 providing an address on the system bus. The address decoder 16 handles memory read addresses the same way it handles fetch addresses. In a system functioning properly it is expected that the fetch addresses will represent retrieval of data (i.e. instructions for execution) only from locations that contain data, namely from the memory devices containing the stored program. In a system functioning properly it is also expected that fetching would never take place from locations containing data such as the descending register. In systems such as those discussed herein, where memory devices 12 and 13 are assumed to contain crucial data, it is expected that no fetching would take place from the memory devices 12 and 13. Indeed it would not be out of the ordinary for periods of time to pass in which fetches and memory accesses (either reading or writing) occurred on the system bus more or less in alternation.

Under the normal steps of a typical stored program (in a system having no mechanical defects) it is expected that processor 10, shortly after initiating bus access to an address giving rise to the assertion of selection lines 32 or 33, will proceed to bus access elsewhere in the address space of the processor. Such bus access elsewhere would reset the counter 56 and avert the decoupling of gates 51, 52, and 53.

As one example, the conventional fetching of instructions for execution may cause the address decoder to stop asserting selection lines 32 and 33 and to assert instead the selection line for some memory device containing stored program. This would be the usual process in a system lacking any mechanical defect. Thus, fetching (at least in a system that is free of mechanical defect) would generally keep the counter 56 reset more or less continuously, except in the special case of processor malfunction where the instruction pointer or program counter happened to point to a crucial memory.

It will be appreciated, then, that in the event of persistent assertion of one of the selection lines 32 or 33 due to a cause other than a mechanical defect, this would be expected to occur only if the processor happened to be fetching instructions for execution from the selected memory. Thus if the processor misbehaves seriously, and if it happens to be doing so while its instruction pointer or program counter is causing instructions (actually, data) to be fetched from the crucial data of one of the memories 12 and 13, the counter 56 would block access to the crucial memory device after the passage of a preset time interval.

In the more general case, however, of a processor misbehaving seriously with its instruction pointer or program counter causing instructions to be fetched from a memory device other than the crucial data, the counter 56 would be periodically cleared, bringing an end to any blocking of access (by gates 51, 52, and 53) to the crucial memory device. In summary, though the system of FIG. 3 protects against some mechanical failures, it does not comprehensively protect against the potential problem of a processor misbehaving seriously.

FIGS. 4 and 5 show another prior-art system intended to protect data in crucial memory devices, say memory devices 12 and 13. In the system of FIG. 4, the processor 10, address bus 14 and 17, and address decoder 16 are as in FIG. 1. The memory devices 11, 12, 13 all receive respective selection signals from the address decoder 16 just as in the system of FIG. 1. Memory device 11 receives the write strobe signal of line 15 as in the system of FIG. 1. Crucial memory devices 12 and 13, however, receive inputs at their write strobe inputs 22 and 23 not from line 15 but from a window circuit 70. Window circuit 70 receives requests from the processor 10 by I/O port transactions or, preferably, by memory-mapped I/O transactions. In the latter arrangement a selection signal 35 from address decoder 16 is provided to the window circuit 70, and preferably it also receives low-order address bits from low-order address bus 18.

In FIG. 5, depicting the window circuit, an output 86 of latch 80 is normally low. The normally-low state of line 86 turns off an AND gate 81 so that a write strobe signal 72 for the memory 12 is unasserted. With the line 86 low, the write strobe signal of line 15 does not have any effect on the output 72 of the window circuit 70. For similar reasons an output 73 is also unasserted.

When line 86 and a corresponding line 96 are both low, which is typically most of the time, a pair of counters 83, 93 are continuously cleared. Outputs 87 and 97 of the counters 83, 93 are thus both low, so that an OR gate 85 has a low output 71. The processor 10 receives the unasserted signal 71 at its reset input 75, so is permitted to continue normal execution of the stored program.

Under control of the stored program the processor 10 gains write access to crucial memory devices 12 or 13 as follows. Referring now to FIG. 5, to write to memory device 12 the processor writes a command to the latch 80 representative of a request for access. The output 86 of latch 80 goes high, turning on the gate 81 and permitting write strobe signals of the line 15 to be communicated to the output 72 of the window circuit, and thence to the write strobe input of memory device 12. The high level of line 86 causes an inverter 82 to go low, removing the clear input to the counter 83. Counter 83 commences counting, and if it reaches a preset threshold its output 87 goes high, turning on OR gate 85. This resets the processor 10. The preset threshold of counter 83 is changeable by commands to a latch 84 from the processor. In the normal course of execution of a stored program, typically the processor 10 would write a second command to latch 80 shortly after making its accesses to memory device 12, causing the output 86 of latch 80 to return to its normal, low state. This would reset the counter 83 and avert any resetting of the processor 10.

Similarly, if the processor 10 writes a command (called a setting signal) to a latch 90 to turn on the line 96, write access to the memory device 13 will be possible, and the clock 93 will begin counting. In the normal course of events typically the processor 10 would fairly promptly write a second command (called a clearing signal) to latch 90, cutting off the write strobe signal to device 13 and clearing the counter 93. The counter 93 is programmable by commands to a latch 94. As a consequence, each of the counters is individually programmable. This is desired because the memories 12, 13 are preferably of different storage technologies, for which different writing and access times may apply. Thus a memory of a technology with a slow access time may be accommodated by programming its respective counter for a longer interval, while memory of a technology with a fast access time may be more closely protected by programming its respective counter for a shorter interval.

In the system of FIG. 4, a latch 74 is provided, external to the processor 10 and capable of latching the reset signal 71. The stored program for processor 10 preferably has steps that check, upon execution starting at zero, to see whether the latch 74 is set. If it is not, the assumption is that the execution from zero was due to initial application of power. If latch 74 is set, the assumption is that execution from zero was due to a reset from the window circuit 70, and the processor can appropriately note the event. Repeated notations of a reset due to the window circuit 70 will preferably cause the processor 10, under stored program control, to annunciate an appropriate warning message to the user.

While the system of FIGS. 4 and 5 offers some advantages over the prior art, such as limiting the circumstances in which access to crucial memory devices is available, a possible drawback is that the system provides a window of time during which a processor misbehaving seriously can alter crucial data without being detected. This is also a problem with the system of FIG. 3. As described above, these systems employ counters which, upon reaching a preset threshold, will reset the processor. During that window of time the processor has access to the crucial memory area. Typically, the threshold will be set for an interval which is hundreds, perhaps thousands, of times longer than the length of a write cycle. Therefore, a processor misbehaving seriously could write to the protected area many times over without being detected. Also, the systems of FIGS. 3 and 4 have a high component count. A high component count often means that the system will cost more to fabricate and consume more power while making the system less reliable and giving the designer less flexibility.

It would be most desirable if crucial data could enjoy more comprehensive safeguards against processor malfunction, with the safeguards implemented in such a way as to permit restoration of proper processor function if possible.

SUMMARY OF THE INVENTION

In accordance with the invention there is provided a data protection apparatus, typically in a postage printing system, comprising a processor addressing an address space, a first memory, a bus interconnecting the processor and the memory, a first address decoder generating a first selection signal in response to addresses in a first range thereof said first memory selected by the first selection signal, a second address decoder generating a second selection signal in response to addresses in a second range of addresses nonidentical to the first range of addresses and having at least one address in common with the first range, and a protection circuit operatively coupled to the processor to receive a request signal therefrom, said protection circuit annunciating the event of generation of second selection signal in the absence of receipt of a request signal.

BRIEF DESCRIPTION OF THE DRAWINGS

The invention will be shown and described with reference to drawings, of which.

Like elements in the figures have, where possible, been shown with like reference designations.

DETAILED DESCRIPTION

Figure 1:
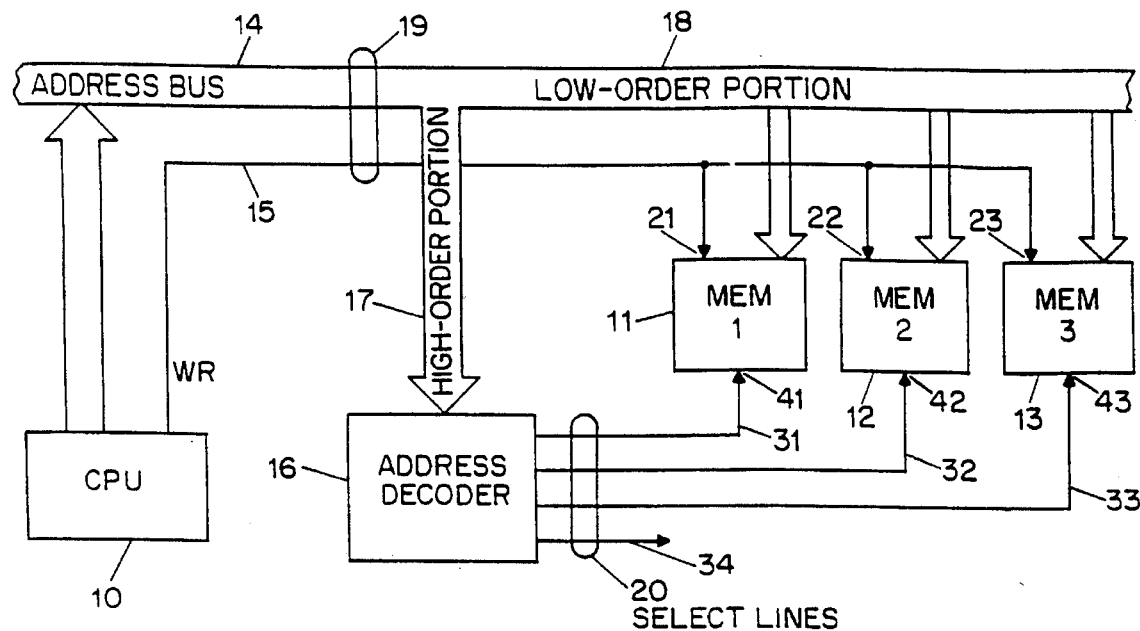
FIGS. 1, 2, 3 and 4 are functional block diagrams of prior art memory addressing systems.
Figure 2:
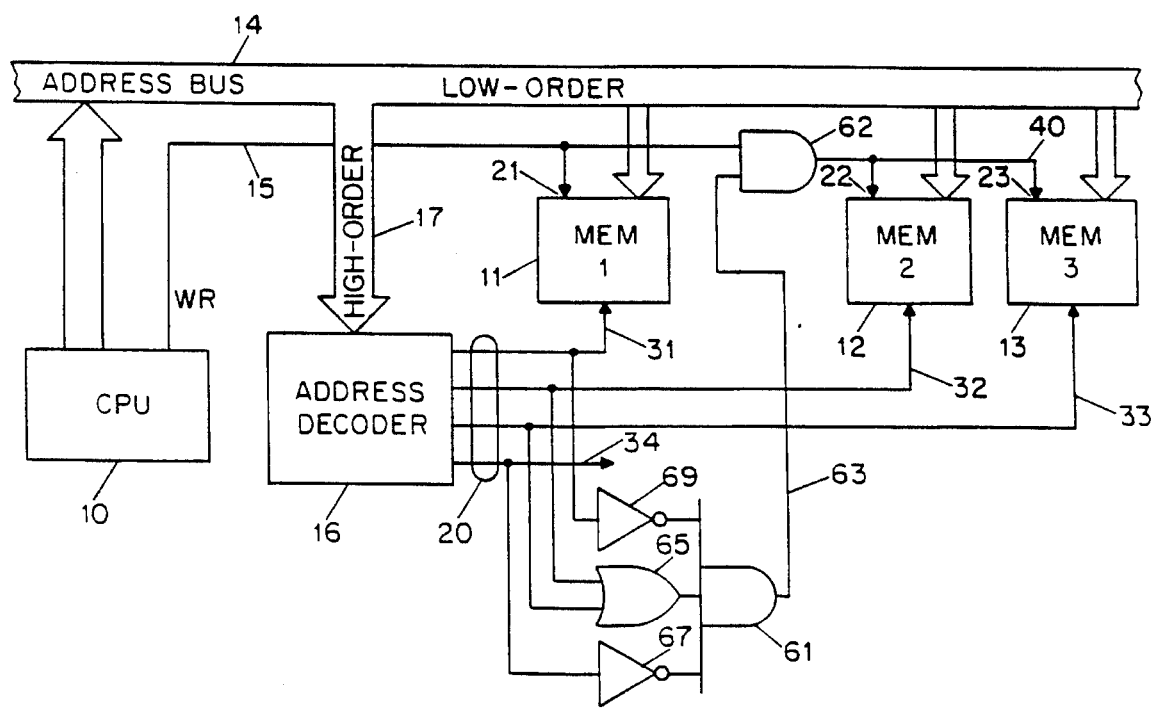
Figure 3:
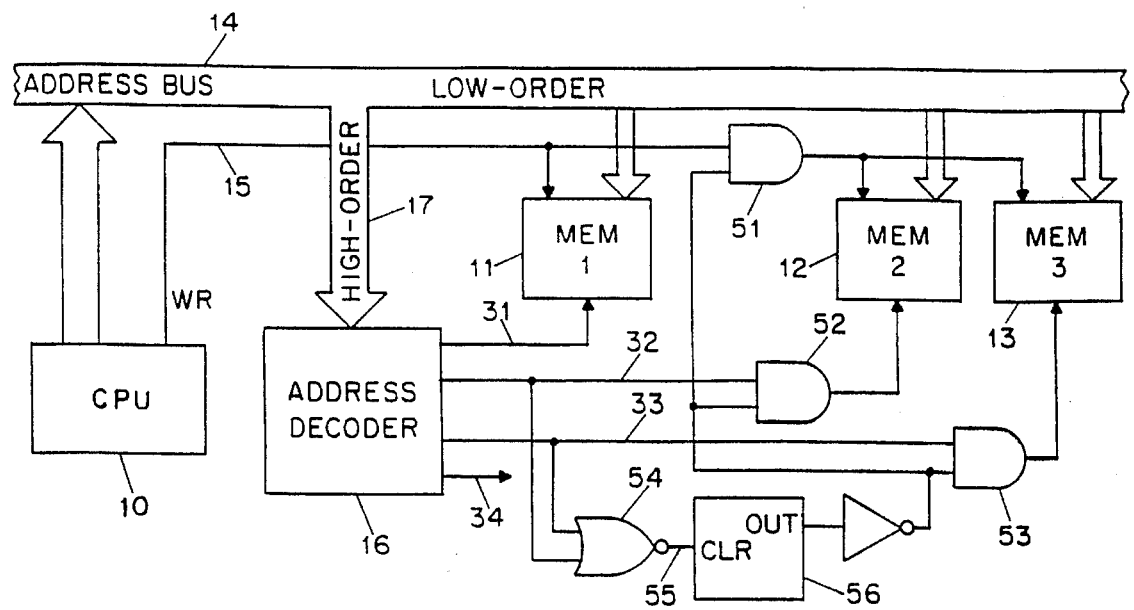
Figure 4:
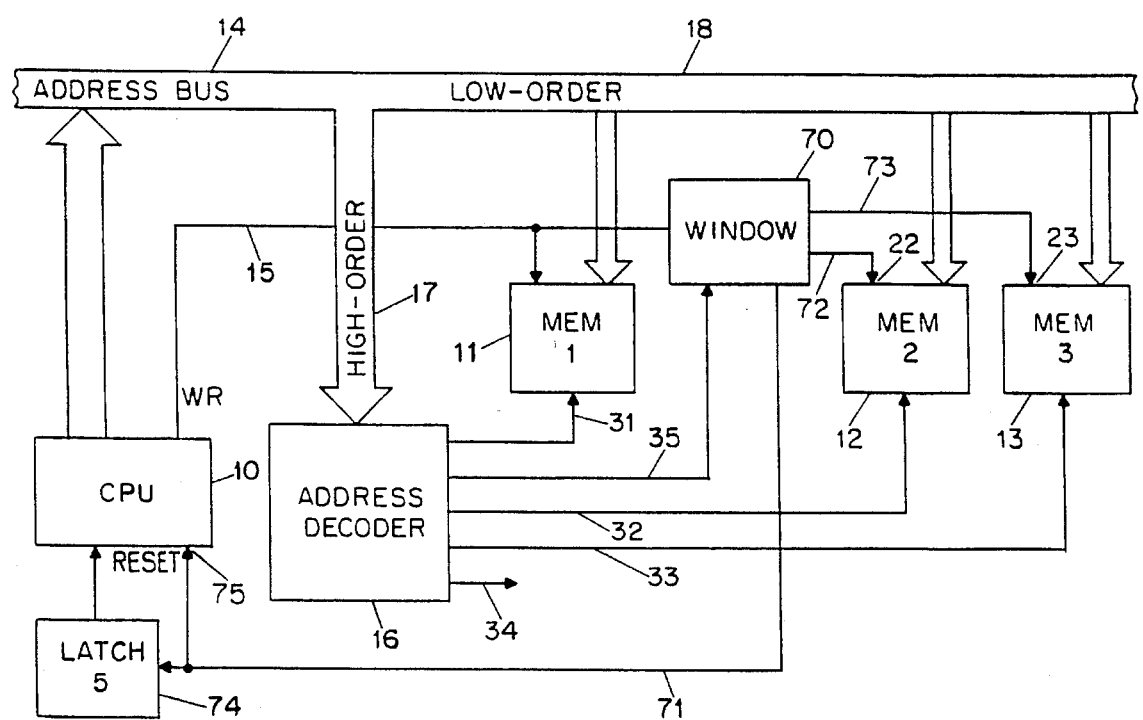
Figure 5:
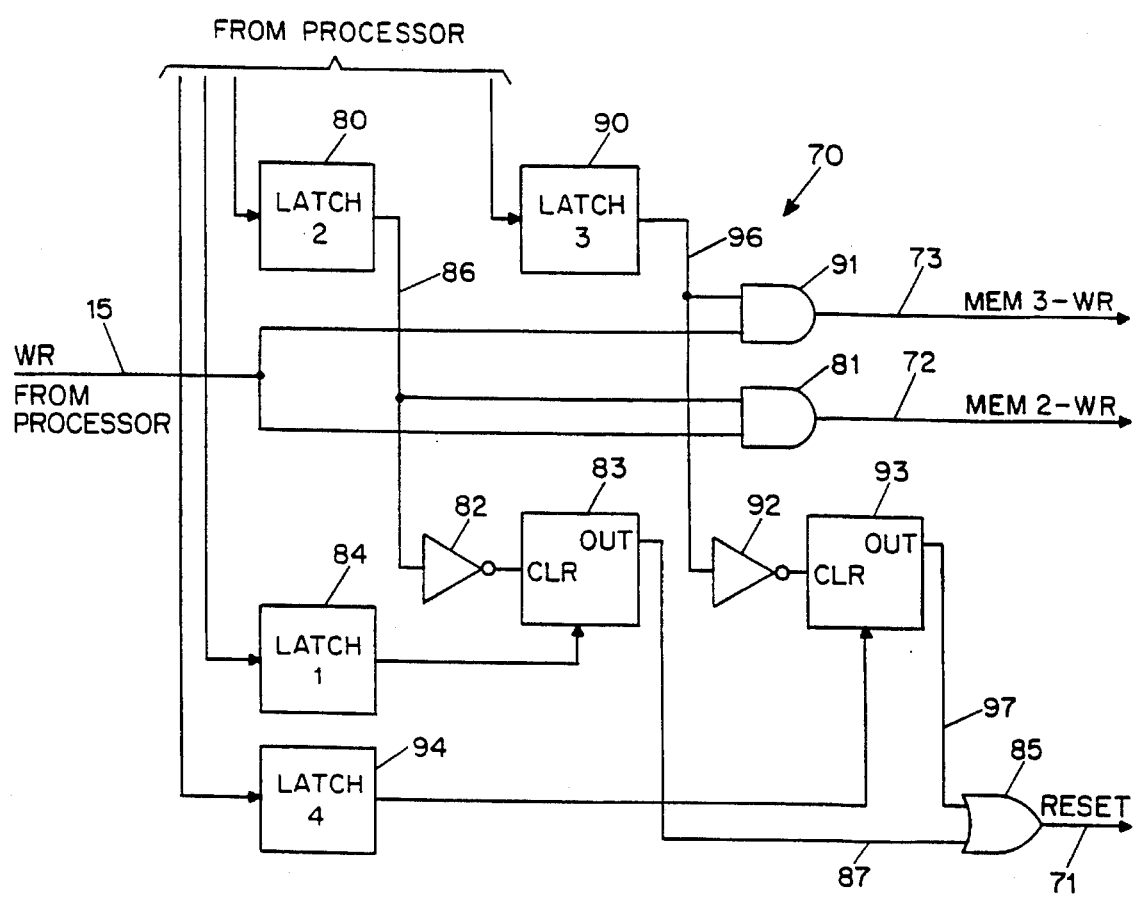
FIG. 5 is a functional block diagram of the window circuit of FIG. 4.
Figure 6:
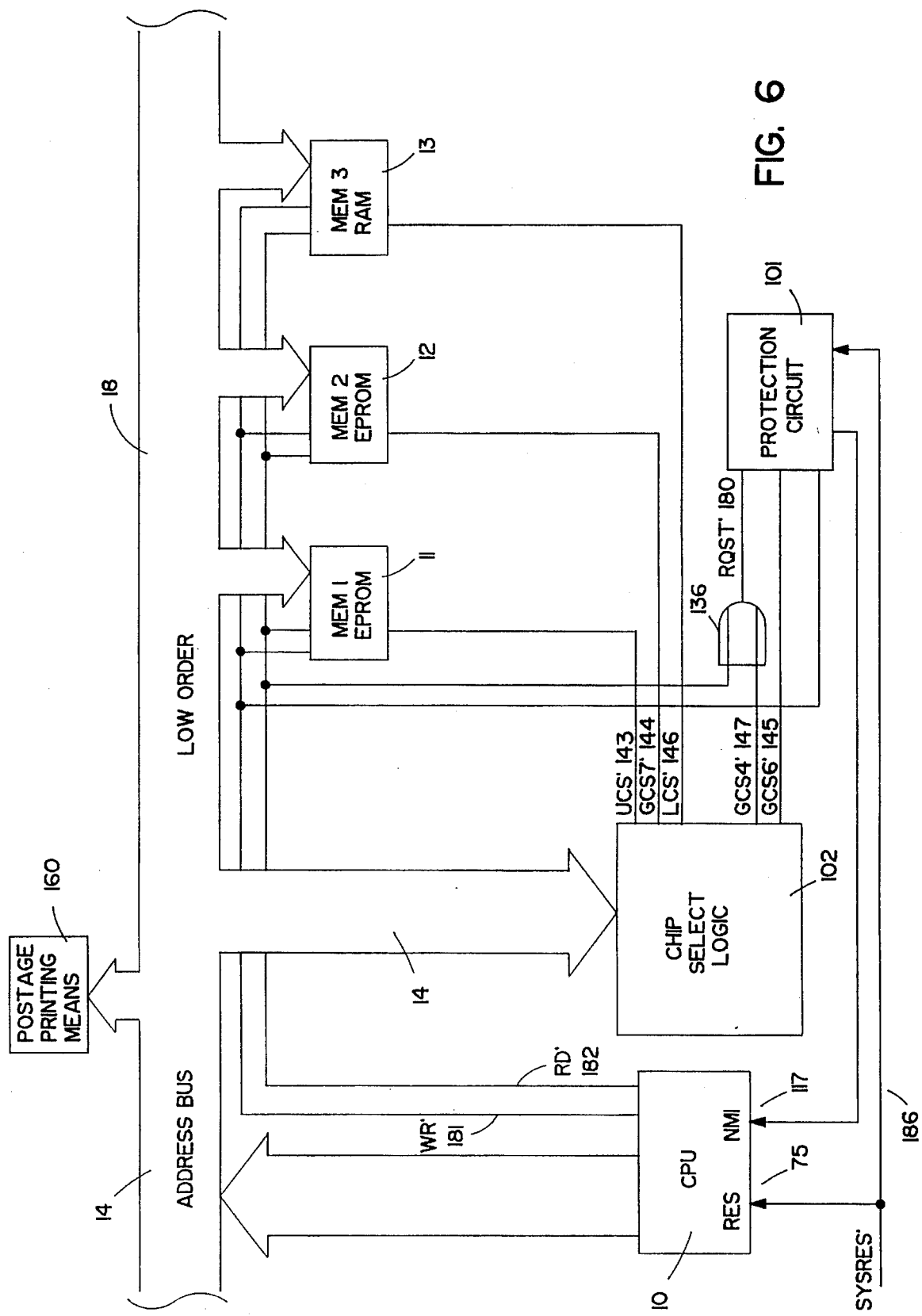
FIG. 6 is functional block diagram of a memory addressing system according to the invention, including a protection circuit and chip select logic.

Turning now to FIG. 6, a block diagram shows a system of an embodiment of the present invention. The prime (') symbol following the signal names indicates that the signals are active when they are logic low. Processor 10 provides address signals to the address bus 14, just as in the system of FIG. 1. The memory devices 11, 12, 13 all receive respective selection signals from the address decoder 16 just as in the system of FIG. 1. The memory devices 11, 12, 13 also receive the write signal WR' 181 directly from the processor 10. These memory devices may be nonvolatile memories. The processor 10 provides address signals on the address bus 14 to the chip select logic 102. Unlike conventional chip select logic, the chip select logic 102 of the present invention generates more than one selection signal when certain predetermined memory locations are addressed. In this way, the memory protection system can be designed to protect all or a portion of one or more memory devices. For example, in a typical system, one memory device will correspond to a range of addresses and another memory device will have another range of addresses. The two ranges will have no address in common. Here, the chip select logic 102 is designed to activate an additional chip select signal GCS6' on line 145 if any of a third range of address spaces is addressed. This extra chip select line 145 is used as an input to a protection circuit 101. The third range of addresses may encompass all or a portion of either of the first two address ranges.

Figure 9:
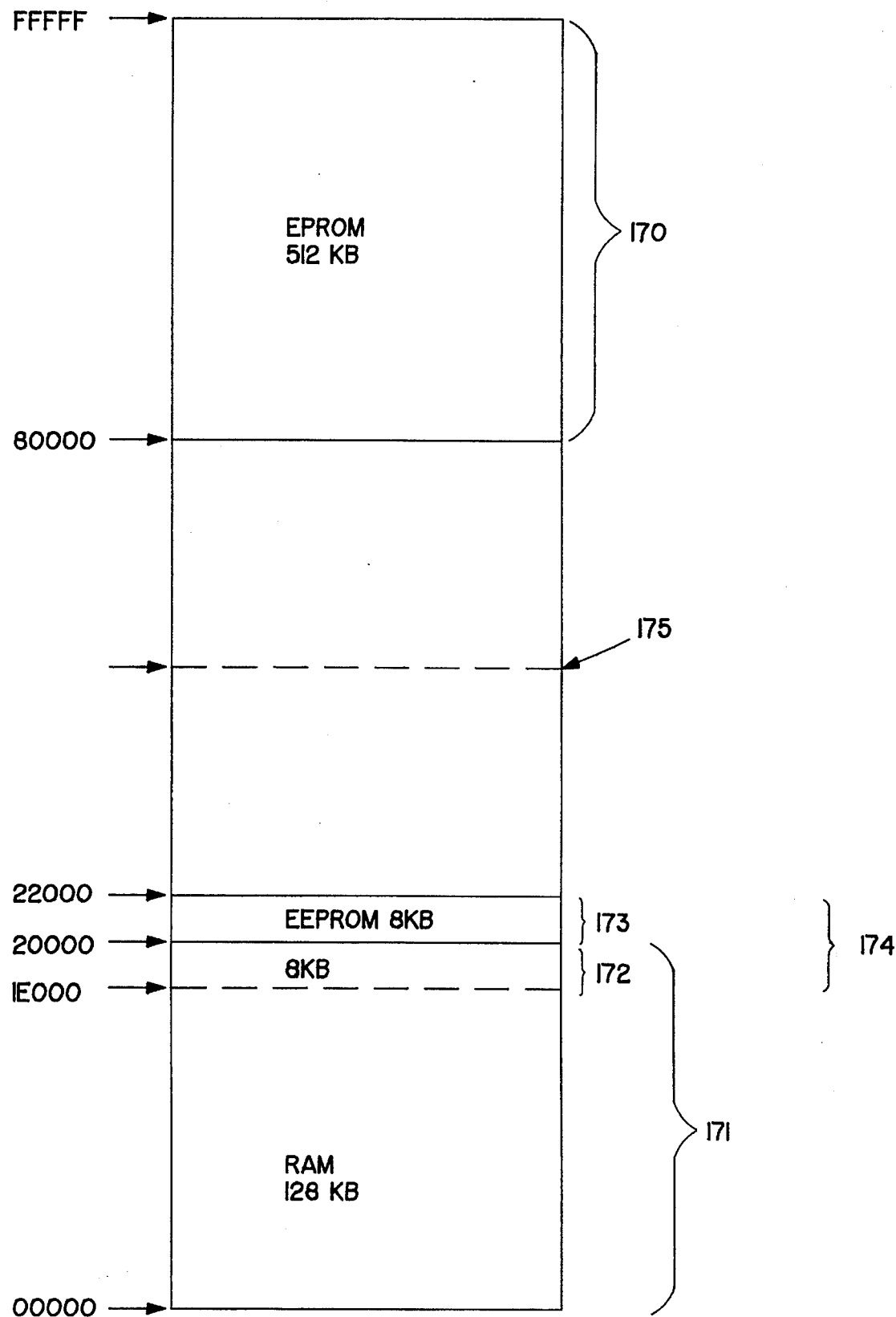
FIG. 9 is a memory map of the system according to the invention.

This arrangement is shown in FIG. 9, the memory map of this embodiment of the system. The upper portion of memory from 80000 to FFFFF, which is memory address area 170, is assigned to memory device 11, an EPROM device. Memory device 11 is selected by a chip select signal UCS' 143. In the embodiment shown here, there are no protected addresses in memory address area 170. The lower portion of memory from 00000 to 1FFFF, which is memory address area 171, is assigned to memory device 13, a RAM device. Memory device 13 is selected by a chip select signal LCS' 146. A portion of memory address area 171, the upper 8k from 1E000 to 1FFFF, denoted memory address area 172, is afforded protection from spurious write cycles by the system of the invention. The memory locations from 20000 to 21FFF, denoted memory address area 173, are assigned to memory device 12, an EEPROM device, and are also afforded protection. Memory device 12 is selected by a chip select signal GCS7' 144. Thus, memory address area 172 plus memory address area 173 comprise a protected memory area 174. An address decoder of the logic 102 is set up so that when an address in the protected memory area 174 is addressed, the additional chip select signal GCS6' 145 becomes active.

Figure 8:
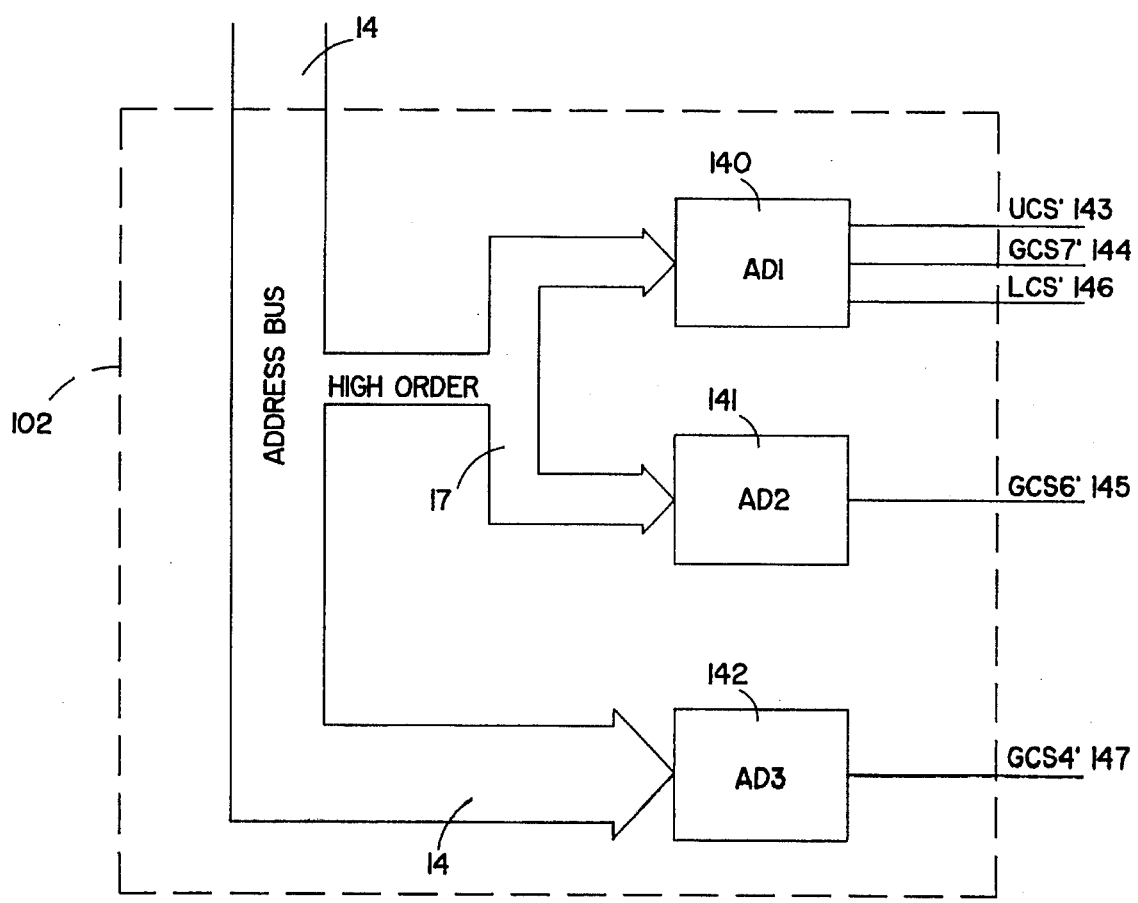
FIG. 8 is a functional block diagram of the chip select logic of FIG. 6.

In order to generate the additional chip select signal GCS6' 145, the chip select logic 102 may be implemented by several address decoders, an example of which is shown in FIG. 8, or by a single unconventional address decoder, where a conventional address decoder is one that operates such that for each one of a multiplicity of addresses in the address space, exactly one of a plurality of selection signals is generated. In FIG. 8, address decoder 140 is a conventional address decoder. The second address decoder 141 generates GCS6' 145 which is active when an address in the protected memory area 174 is addressed. Both address decoders 140 and 141 receive the high-order address lines 17 from the address bus 14. In this embodiment, the third address decoder 142, which will be discussed below, receives all the address lines of the address bus 14. The additional selection signal GCS6' 145 is utilized by the protection circuit 101, along with other processor-generated signals, to determine whether the protected memory area 174 has been intentionally or erroneously selected by the processor 10, thereby reducing the likelihood of the loss of important data which may result from spurious write signals.

In addition to GCS6' 145, a request signal RQST' 180 is input to the protection circuit 101. RQST' 180 is generated by the stored program of the processor 10 just prior to the processor 10 accessing an address in the protected memory area 174, that is, simultaneously generating an active write signal WR' 181 and an active chip select signal GCS6' 145. If the attempted write to the protected memory area 174 is the result of a processor error, rather than an intended instruction, the stored program of the processor 10 would probably not have previously generated the request signal RQST' 180. In this manner, presence or absence of RQST' 180 lets the protection circuit 101 know whether the attempted write to the protected memory area 174 is the result of a processor error.

In this embodiment of the invention, the request signal RQST' 180 is the conjunction of RD' 182 and a chip select signal GCS4' 147. The conjunction is implemented here by an OR gate 136. GCS4' 147 is generated by the third address decoder 142 within the chip select logic 102. Unlike address decoders 140 and 141, address decoder 142 receives all the address lines from the address bus 14 so that only one specific address 175 will cause the address decoder 142 to activate GCS4' 147. GCS4' 147 is generated in response to the processor 10 addressing this predetermined address 175 as part of the stored program's "request" activity. The request activity also includes generating an active RD' 182 simultaneously with the predetermined address 175.

When the protection circuit 101 receives an active RQST' 180 prior to an active WR' 181 during which an address in the protected memory area 174 is selected, the protection circuit 101 does not take any corrective action. However, if an address in the protected memory area 174 is selected while WR' 181 is active, and the protection circuit 101 has not previously received an active RQST' 180, the protection circuit 101 will annunciate the error by sending an active signal NMI 185 to the processor nonmaskable interrupt input 117.

Those skilled in the art will readily appreciate that, rather than using a "read" operation from a predetermined single address in the memory space of the processor, one could employ any of a wide range of request activities in this connection without departing in any way whatsoever from the invention. In other embodiments, one could employ a "write" activity to a predetermined address, or an input or output to or from a predetermined port in the I/O space of the processor. Furthermore, in systems where less than all the address space is filled with responsive hardware, it would not be necessary that the above-mentioned predetermined address be a single address; a range of addresses could be used. Stated differently, the third address decoder might only incompletely decode the address bus, decoding less than all of the address lines, for example. Finally, depending on the hardware configuration of the processor, the request signal could be a discrete output of the processor, a serial output of the processor, or any other usable signal or combination of signals from the processor.

It will also be appreciated that the disclosed embodiment has the output of the protection circuit as a nonmaskable interrupt to the processor. This is felt preferable, and the software design preferably defines an interrupt handler for the nonmaskable interrupt that takes corrective action as required. Corrective action includes, for example, logging the error to an error log region in nonvolatile memory, storing useful debugging information such as the stack contents, and manipulating the stack so that when control returns from the interrupt handler (i.e. when the subroutine stack is popped) control will pass to a well defined address rather than the presumably aberrant address previously being executed. As another corrective step, the software activity may include performing a cross-check between the two stored copies of the descending register and between stored copies of other crucial information such as batch count, piece count, ascending register, and the like.

Those skilled in the art will further appreciate, however, that other output configurations could be employed without deviating from the invention. For example, the output could be a reset to the processor, which may be thought of as a highest-priority interrupt. As another example, one could employ a hardware latch to store the event of the protection circuit having been triggered. Then, after the processor has been reset or interrupted, the processor could consult the state of that hardware latch to ascertain the reason for the reset or interrupt. As yet another example, the output could be an input to a system that denies further access to the protected memories by means of a hardware-level interruption in the bus control signals to the protected memories. The latter approach does, of course, increase the component count and forgoes the possibility of a software recovery through the simple application of the interrupt to the processor.

Figure 7:
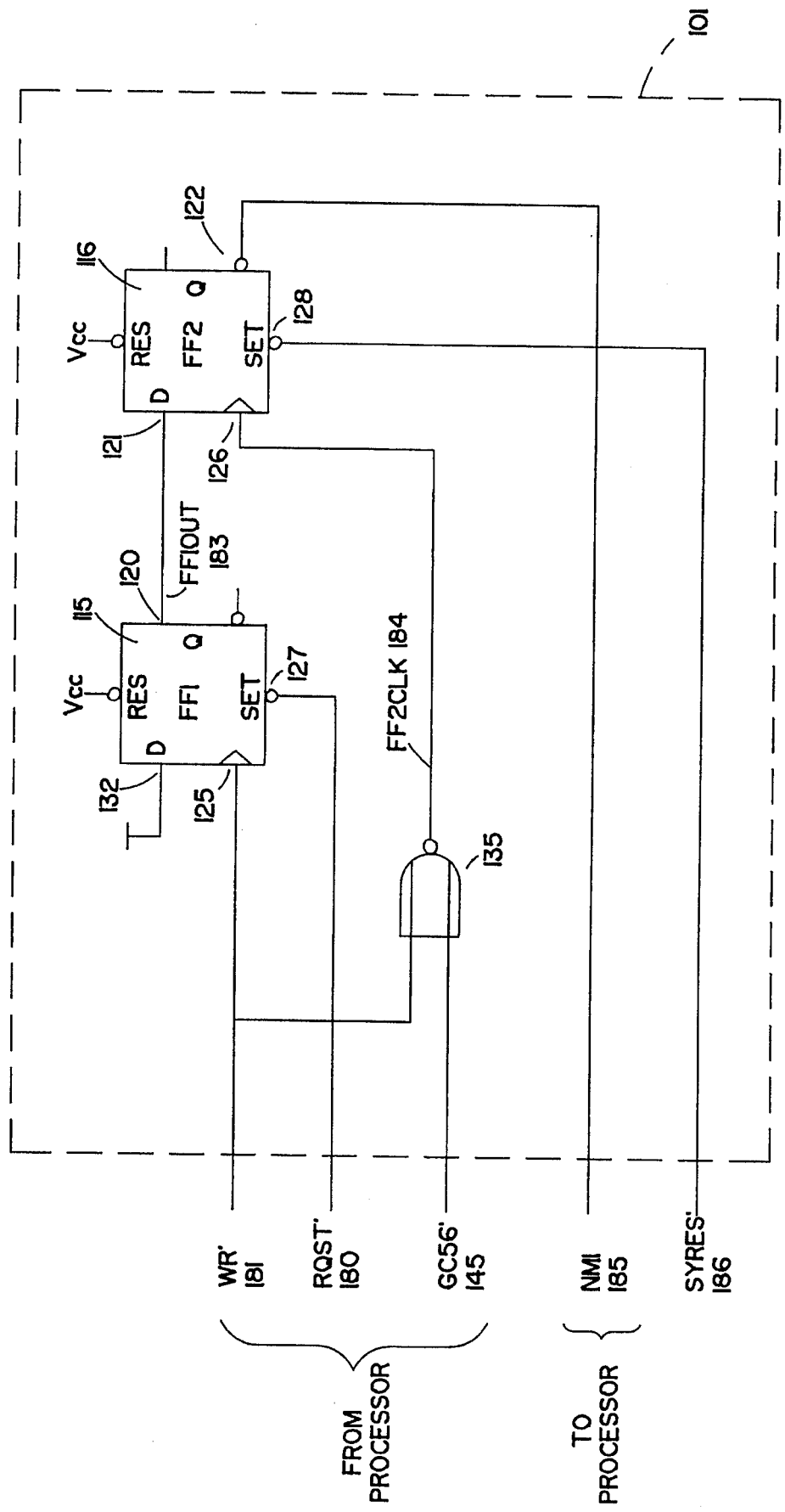
FIG. 7 is a functional block diagram of the protection circuit of FIG. 6.
Figure 10:
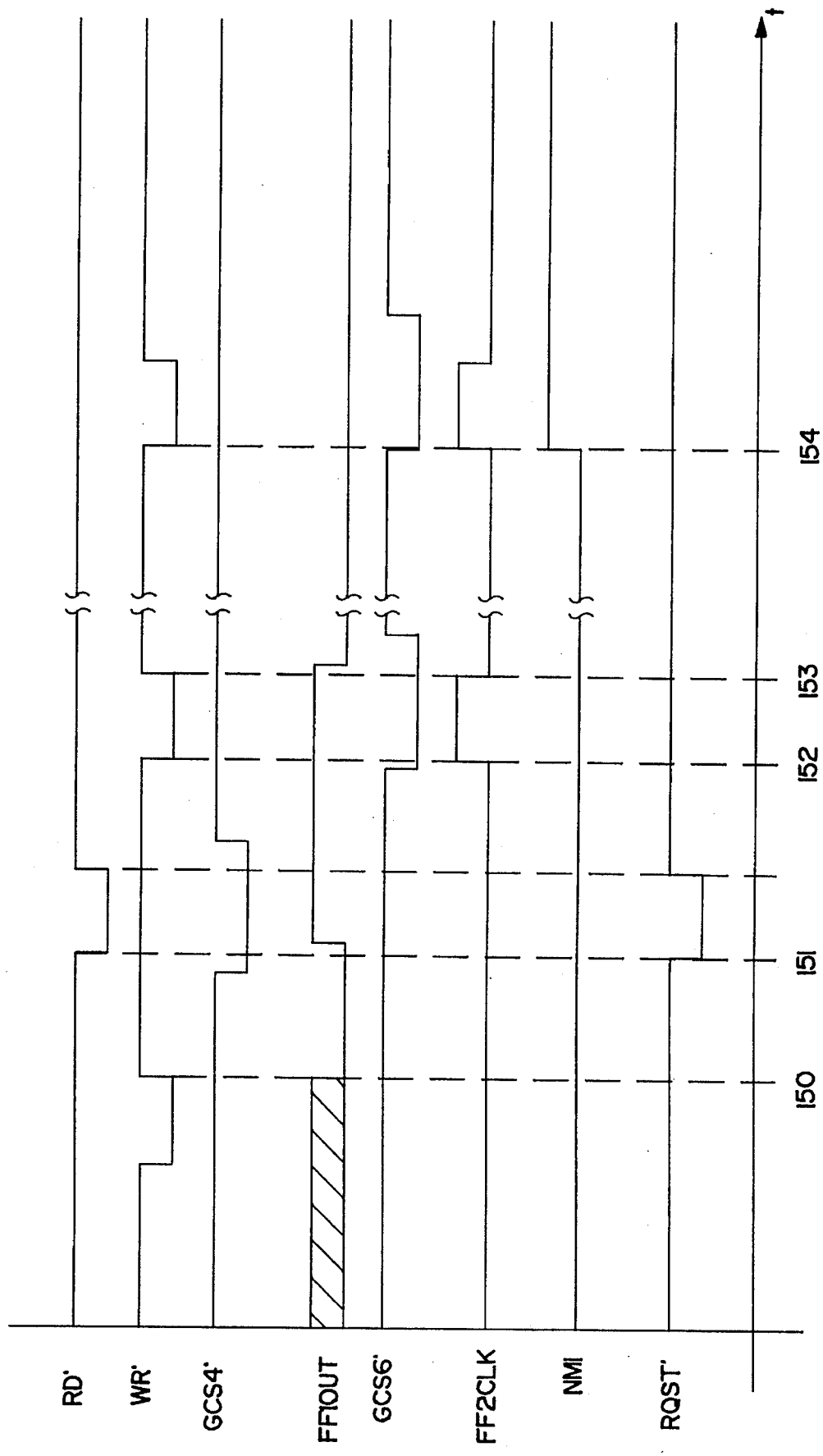
FIG. 10 is a timing diagram of the system according to the invention.

Referring now to FIGS. 7 and 10, the protection circuit 101 works as follows. At time 150, the positive edge WR' 181 triggers a bistable gate, here a D-type flip-flop 115, at the clock input 125. The D input 132 of flip-flop 115 is tied to a low signal. Therefore, flip-flop 115 will be cleared and an output signal FF1OUT 183 at the Q output 120 will be low when flip-flop 115 receives the positive edge of any WR' 181. This clearing operation is also seen to occur at time 153.

The "set" input 127 of flip-flop 115 is tied to the output of the OR gate 136, i.e., the request signal RQST' 180. At time 151, RQST' 180 is active, causing FF1OUT 183 at the Q output 120 of flip-flop 115 to be set to a high state. The Q output 120 of flip-flop 115 is connected to the clocked input 121 of a second bistable gate, here another a D-type flip-flop 116. Flip-flip 116 is triggered at its clock input 126 by a signal FF2CLK 184. FF2CLK 184 is high during the simultaneous occurrence of an active WR' 181 and an active GCS6' 145, i.e., a write to a protected area of memory, and is implemented by a NOR gate 135. As shown at 154, if flip-flop 115 has not been set by RQST' 180, and flip-flip 116 is triggered by an attempt to write to the protected area, the low FF1OUT 183 signal at the flip-flop 115 Q output 120 is input to flip-flop 116 and the Q' output 122 of flip-flop 116 sends a high signal NMI 185 to the nonmaskable interrupt input 117 of the processor 10 as an annunciation of an erroneous write cycle to the protected memory area 174. Thus an attempt to access the protected area without the processor 10 having generated a proper request signal RQST' 180 will cause an interrupt in the system.

On the other hand, if the attempted write to the protected area is not the result of a processor error, the processor 10 will have generated RQST' 180 prior to receipt by flip-flop 116 of signal FF2CLK 184 at the clock input 126 of flip-flop 116, thus setting flip-flop 115. In this case, a high FF1OUT 183 signal will be output from flip-flop 115 and input to flip-flop 116 when flip-flop 116 is triggered, and the flip-flop 116 output Q' 122 will be a low signal when triggered by FF2CLK 184. Therefore, as seen at time 152, no non-maskable interrupt occurs. Note that the entire system will be reset if a SYSRES' 186 is asserted. This signal is received at the "reset" input 75 of the processor 10 and at the "set" input 128 of flip-flop 116.

The invention as described above has many practical applications. The embodiment depicted in FIG. 6 includes a postage printing means 160 controlled by the processor 10. In a typical postage printing system, there is a descending register which indicates the amount of postage available for printing. The data contained in the descending register is considered crucial and thus would be written to the protected memory area 174 of the present invention to protect the data from spurious write cycles.

Figure 11:
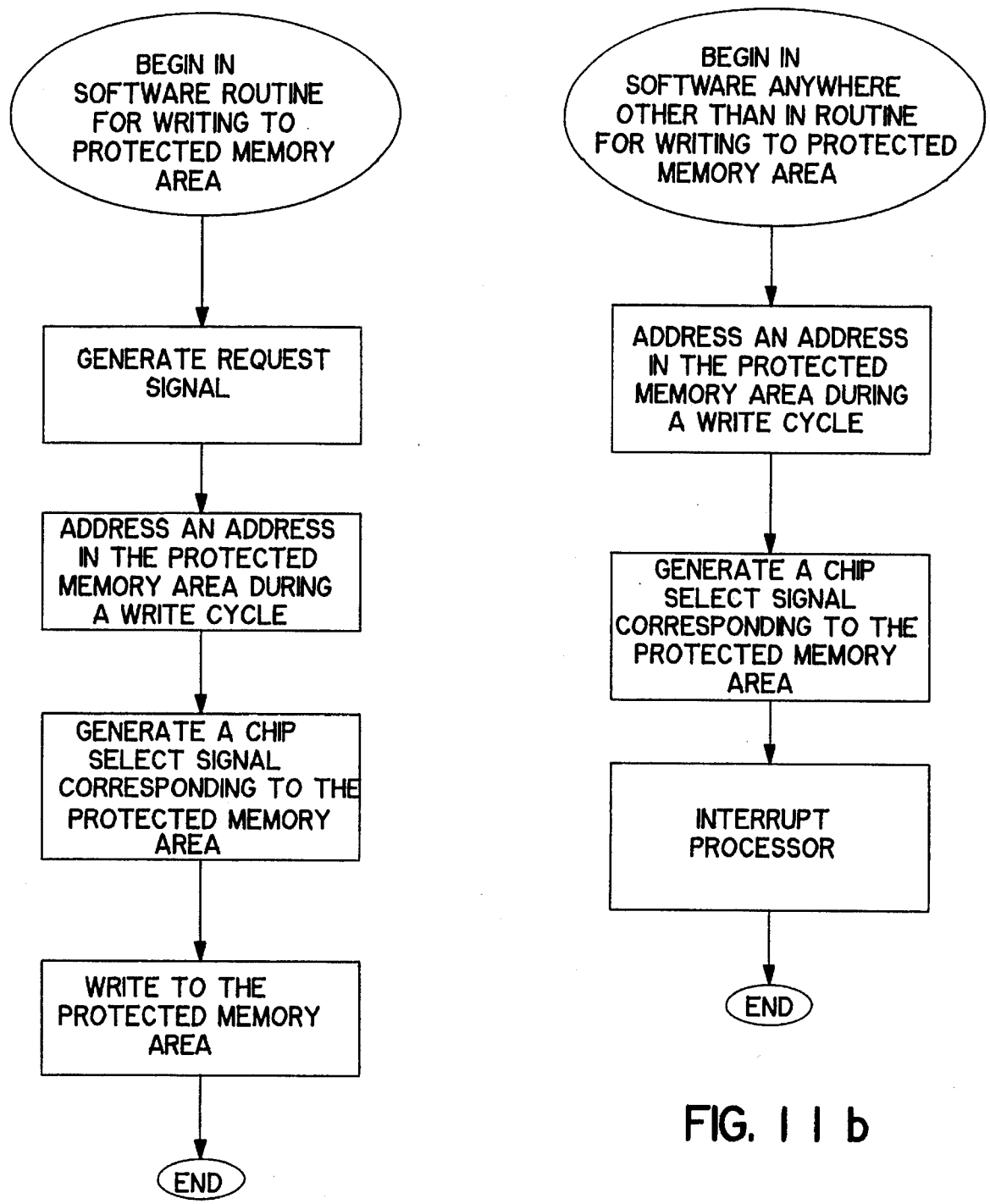
FIGS. 11(a) and 11(b) are flow chart representations of the methods according to the present invention.

Referring now to FIGS. 11(a) and 11(b), the method of the invention is depicted in flowchart form. FIG. 11(a) is the method of the invention which is performed when the processor 10 is correctly writing to the protected memory area 174. This assumes that the software is running the correct routine for writing to the protected memory area. As such, a request signal is generated. The processor 10 then addresses an address in the protected area of memory 174 during an active WR' signal and the chip select logic 102 generates the chip select signal corresponding to the memory device being accessed as well as the chip select signal GCS6' corresponding to the protected memory area 174. Finally, data is written to the protected memory area 174.

When the apparatus includes a postage printing means 160, having a descending register which indicates the amount of postage available for printing, the write to the protected memory is characterized by storing the descending register data within the protected memory area 174.

FIG. 11(b) is the method of the invention which is performed when the processor erroneously attempts to write to the protected memory area 174. This assumes that the software is not running the correct routine for writing to the protected memory area and therefore no request signal is generated. It is postulated that this could happen if through some misfortune the processor happened to start executing data rather than program code, for example. First, the processor 10 addresses an address in the protected area of memory 174 during an active WR' signal. Then the chip select logic 102 generates the chip select signal corresponding to the memory device being accessed as well as the chip select signal GCS6' corresponding to the protected memory area 174. Since this is an illegitimate attempt to write to the protected memory area 174, the processor 10 is interrupted.

It will be appreciated that the system and method of the present invention have several advantages over the prior art. First, the memory protection system of the present invention allows for flexibility in choosing what memory is to be protected. Unlike conventional memory protection systems, the present invention may be implemented to protect all or only a portion of a particular memory device. Additionally memory locations in more than one memory device may be protected and these memory devices may be of differing technologies.

Moreover, the memory protection system of the present invention does not wait a predetermined interval of time before taking protective action as do the prior art systems which employ "watchdog" circuits, "window" circuits and circuits which monitor the length of time a selection output is selected. Such systems provide a window of time during which crucial data may be lost from the protected memory area. In the present invention flip-flop 115 is cleared after each active write cycle. This is illustrated at 150 and 153 of FIG. 10. Thus, if the protected memory area 174 is selected during a write cycle other than the one immediately following generation of the request signal, the output of flip-flop 115, and necessarily the input of flip-flop 116, will have gone back to a low signal and the protection circuit 101 will interrupt the processor 10 with a high flip-flop 116 Q' output. Therefore, there is no window of time available to a misbehaving processor in which the processor could erroneously write a possible multiplicity of bytes of data to the protected memory area 174.

One further advantage over the prior art is the low component count of the present invention. In its preferred embodiment, the protection circuit 101 consists of only two flip-flops and two logic gates. Other, less effective, memory protection measures require numerous counters, latches and logic gates. A low component count provides four benefits. First, the cost of fabrication is decreased. Typically, the memory protection device of the present invention will be fabricated on a separate application-specific integrated circuit (ASIC) so fabrication is an important consideration. Second, the ASIC will take up less space, giving greater flexibility for the design of the overall system. Third, reducing component count reduces power consumption, which is of particular importance in a protection circuit since the circuit is relied on heavily when the system is running on backup power. Fourth, reliability of a circuit which employs fewer components is greater since there are fewer parts which could fail.

While the above is a description of the invention in its preferred embodiment, various modifications, alternate constructions and equivalents may be employed. Therefore, the above description and illustration should not be taken as limiting the scope of the invention which is defined by the appended claims.

We claim:

1. A data protection apparatus comprising: a processor addressing an address space, a memory area comprising a first memory, a bus interconnecting the processor and said first memory, a first address decoder generating a first selection signal in response to addresses in a first range of said first memory selected by the processor; a second address decoder generating a second selection signal in response to addresses in a second range of addresses of said first memory selected by the processor, said second range of addresses being nonidentical to the first range of addresses and having at least one address in common with the first range; and a protection circuit operatively coupled to the processor to receive a request signal therefrom, said protection circuit annunciating the event of generation of a second selection signal in the absence of receipt of a request signal.

2. The data protection apparatus of claim 1 further characterized in that the first address decoder generates a plurality of selection signals such that for each of a multiplicity of addresses in the address space, exactly one of the plurality of selection signals is generated.

3. The data protection apparatus of claim 1 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

4. The data protection apparatus of claim 1 wherein the first address decoder, second address decoder and protection circuit comprise an application-specific integrated circuit.

5. The data protection apparatus of claim 4 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

6. The data protection apparatus of claim 1 further comprising a second memory in said memory area, wherein the first address decoder generates a third selection signal in response to addresses in a third range of addresses in said memory area, the third range having no addresses in common with the first range, the third range having at least one address in common with the second range, and wherein said second memory is selected by the third selection signal.

7. The data protection apparatus of claim 6 wherein the first address decoder, second address decoder and protection circuit comprise an application-specific integrated circuit.

8. The data protection apparatus of claim 6 wherein the first and second memories are nonvolatile, and employ differing storage technologies.

9. The data protection apparatus of claim 8 further comprising postage printing means controlled by the processor and first and second descending registers indicative of an amount of postage available for printing; wherein the first descending register is stored in the first memory within the second range of addresses, and the second descending register is stored in the second memory within the second range of addresses, whereby data contained in the descending register are protected from spurious processor write cycles.

10. The data protection apparatus of claim 8 wherein the first address decoder, second address decoder and protection circuit comprise an application-specific integrated circuit.

11. The data protection apparatus of claim 10 further comprising postage printing means controlled by the processor and first and second descending registers indicative of an amount of postage available for printing; wherein the first descending register is stored in the first memory within the second range of addresses, and the second descending register is stored in the second memory within the second range of addresses, whereby data contained in the descending register are protected from spurious processor write cycles.

12. The data protection apparatus of claim 1 further comprising a third address decoder responding to an address in said memory area, and wherein the request signal received by the protection circuit comprises a read cycle for the address.

13. The data protection apparatus of claim 12 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

14. The data protection apparatus of claim 12 wherein the first address decoder, second address decoder, third address decoder and protection circuit comprise an application-specific integrated circuit.

15. The data protection apparatus of claim 14 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

16. The data protection apparatus of claim 12 further comprising a second memory in said memory area, wherein the first address decoder generates a third selection signal in response to addresses in a third range of addresses in said memory area, the third range having no addresses in common with the first range, the third range having at least one address in common with the second range, and wherein said second memory is selected by the third selection signal.

17. The data protection apparatus of claim 16 wherein the first and second memories are nonvolatile, and employ differing storage technologies.

18. The data protection apparatus of claim 17 further comprising postage printing means controlled by the processor and first and second descending registers indicative of an amount of postage available for printing; wherein the first descending register is stored in the first memory within the second range of addresses, and the second descending register is stored in the second memory within the second range of addresses, whereby data contained in the descending register are protected from spurious processor write cycles.

19. The data protection apparatus of claim 12 wherein the protection circuit comprises first and second bistable gates, the first bistable gate being set to a first state by the request signal and set to a second state by a write cycle in the absence of the request signal, said write cycle includes issuing a write signal, the second bistable gate receiving a clocked input signal from the first bistable gate, said input signal being an output signal of the first bistable gate, the second bistable gate being clocked during the write cycle by a trigger signal derived from the write signal, said trigger signal indicating the processor's addressing an address in the second range, the output of the second bistable gate comprising the annunciation.

20. The data protection apparatus of claim 19 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

21. The data protection apparatus of claim 19 wherein the first and second bistable gates comprise D-type flip-flops each having a clock input terminal, a D input terminal, a set input terminal and an output terminal, the write signal operatively connected to the clock input terminal of the first gate, the D input terminal of the first gate operatively connected to a logic "low" level, the set input terminal of the first gate operatively connected to the request signal, the clock input terminal of the second gate receiving the conjunction of the write signal and the second selection signal, the D input terminal of the second gate receiving an output signal of the first gate, and an output signal of the second gate comprising the annunciation.

22. The data protection apparatus of claim 21 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

23. The data protection apparatus of claim 1 wherein the processor has a nonmaskable interrupt input terminal, and wherein the protection circuit annunciates the event by generating a nonmaskable interrupt input signal.

24. The data protection apparatus of claim 23 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

25. The data protection apparatus of claim 23 wherein the first address decoder, second address decoder and protection circuit comprise an application-specific integrated circuit.

26. The data protection apparatus of claim 25 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

27. The data protection apparatus of claim 23 further comprising a third address decoder responding to an address in said memory area, and wherein the request signal received by the protection circuit comprises a read cycle for the address.

28. The data protection apparatus of claim 27 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

29. The data protection apparatus of claim 23 further comprising a second memory in said memory area, wherein the first address decoder generates a third selection signal in response to addresses in a third range of addresses in said memory area, the third range having no addresses in common with the first range, the third range having at least one address in common with the second range, and wherein said second memory is selected by the third selection signal.

30. The data protection apparatus of claim 29 wherein the first and second memories are nonvolatile, and employ differing storage technologies.

31. The data protection apparatus of claim 30 further comprising postage printing means controlled by the processor and first and second descending registers indicative of an amount of postage available for printing; wherein the first descending register is stored in the first memory within the second range of addresses, and the second descending register is stored in the second memory within the second range of addresses, whereby data contained in the descending register are protected from spurious processor write cycles.

32. The data protection apparatus of claim 2 wherein the protection circuit comprises first and second bistable gates, the first bistable gate being set to a first state by the request signal and set to a second state by a write cycle in the absence of the request signal, said write cycle includes issuing a write signal, the second bistable gate receiving a clocked input signal from the first bistable gate, said input signal being an output signal of the first bistable gate, the second bistable gate being clocked during the write cycle by a trigger signal derived from the write signal, said trigger signal indicating the processor's addressing an address in the second range, the output of the second bistable gate comprising the annunciation.

33. The data protection apparatus of claim 32 further comprising postage printing means controlled by the processor and a descending register comprising data indicative of an amount of postage available for printing; and wherein the first memory is nonvolatile, and the descending register is stored in the first memory within the second range of addresses; whereby the descending register data are protected from spurious processor write cycles.

34. The data protection apparatus of claim 32 wherein the first and second bistable gates comprise D-type flip-flops each having a clock input terminal, a D input terminal, a set input terminal and an output terminal, the write signal operatively connected to the clock input terminal of the first gate, the D input terminal of the first gate operatively connected to a logic "low" level, the set input terminal of the first gate operatively connected to the request signal, the clock input terminal of the second gate receiving the conjunction of the write signal and the second selection signal, the D input terminal of the second gate receiving an output signal of the first gate, and an output signal of the second gate comprising the annunciation.

35. The data protection apparatus of claim 34 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

36. The data protection apparatus of claim 1 wherein the protection circuit comprises first and second bistable gates, the first bistable gate being set to a first state by the request signal and set to a second state by a write cycle in the absence of the request signal, said write cycle includes issuing a write signal, the second bistable gate receiving a clocked input signal from the first bistable gate, said input signal being an output signal of the first bistable gate, the second bistable gate being clocked during the write cycle by a trigger signal derived from the write signal, said trigger signal indicating the processor's addressing an address in the second range, the output of the second bistable gate comprising the annunciation.

37. The data protection apparatus of claim 36 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

38. The data protection apparatus of claim 36 wherein the first address decoder, second address decoder, protection circuit, first bistable gate and second bistable gate comprise an application-specific integrated circuit.

39. The data protection apparatus of claim 38 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

40. The data protection apparatus of claim 36 wherein the first and second bistable gates comprise D-type flip-flops each having a clock input terminal, a D input terminal, a set input terminal and an output terminal, the write signal operatively connected to the clock input terminal of the first gate, the D input terminal of the first gate operatively connected to a logic "low" level, the set input terminal of the first gate operatively connected to the request signal, the clock input terminal of the second gate receiving the conjunction of the write signal and the second selection signal, the D input terminal of the second gate receiving an output signal of the first gate, and an output signal of the second gate comprising the annunciation.

41. The data protection apparatus of claim 40 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

42. The data protection apparatus of claim 40 wherein the first address decoder, second address decoder, protection circuit, first bistable gate and second bistable gate comprise an application-specific integrated circuit.

43. The data protection apparatus of claim 42 further comprising postage printing means controlled by the processor and a descending register indicative of an amount of postage available for printing; and wherein the first memory is nonvolatile, and the descending register is stored in the first memory within the second range of addresses; whereby data contained in the descending register are protected from spurious processor write cycles.

44. The data protection apparatus of claim 36 further comprising a second memory in said memory area, wherein the first address decoder generates a third selection signal in response to addresses in a third range of addresses in said memory area, the third range having no addresses in common with the first range, the third range having at least one address in common with the second range, and wherein said second memory is selected by the third selection signal.

45. The data protection apparatus of claim 44 wherein the first and second bistable gates comprise D-type flip-flops each having a clock input terminal, a D input terminal, a set input terminal and an output terminal, the write signal operatively connected to the clock input terminal of the first gate, the D input terminal of the first gate operatively connected to a logic "low" levels, the set input terminal of the first gate operatively connected to the request signal, the clock input terminal of the second gate receiving the conjunction of the write signal and the second selection signal, the D input terminal of the second gate receiving an output signal of the first gate, and an output signal of the second gate comprising the annunciation.

46. The data protection apparatus of claim 44 wherein the first and second memories are nonvolatile, and employ differing storage technologies.

47. The data protection apparatus of claim 46 further comprising postage printing means controlled by the processor and first and second descending registers indicative of an amount of postage available for printing; wherein the first descending register is stored in the first memory within the second range of addresses, and the second descending register is stored in the second memory within the second range of addresses, whereby data contained in the descending register are protected from spurious processor write cycles.

48. The data protection apparatus of claim 46 wherein the first and second bistable gates comprise D-type flip-flops each having a clock input terminal, a D input terminal, a set input terminal and an output terminal, the write signal operatively connected to the clock input terminal of the first gate, the D input terminal of the first gate operatively connected to a logic "low" level, the set input terminal of the first gate operatively connected to the request signal, the clock input terminal of the second gate receiving the conjunction of the write signal and the second selection signal, the D input terminal of the second gate receiving an output signal of the first gate, and an output signal of the second gate comprising the annunciation.

49. The data protection apparatus of claim 48 further comprising postage printing means controlled by the processor and first and second descending registers indicative of an amount of postage available for printing; wherein the first descending register is stored in the first memory within the second range of addresses, and the second descending register is stored in the second memory within the second range of addresses, whereby data contained in the descending register are protected from spurious processor write cycles.

50. A method for use with a data protection apparatus comprising a processor addressing an address space, a first memory, a bus interconnecting the processor and said first memory, a first address decoder generating a first selection signal in response to addresses in a first range of said first memory selected by the processor, a second address decoder generating a second selection signal in response to addresses in a second range of addresses of said first memory selected by the processor, said second range of addresses being nonidentical to the first range of addresses and having at least one address in common with the first range, and a protection circuit operatively coupled to the processor to receive a request signal therefrom, the method comprising the steps of:

addressing an address in the second range of addresses;

generating the second selection signal in the second address decoder; and annunciating in the protection circuit whether the second selection signal has been generated in the absence of receipt of a request signal.

51. The method of claim 50 wherein the protection circuit of the apparatus comprises first and second bistable gates, and wherein the method comprises, after the generating step and before the annunciating step, the further steps of:

clocking the first bistable gate to a first state;

receiving an output signal of the first bistable gate in the first state at the second bistable gate; and clocking the second bistable gate, an output signal of the second bistable gate comprising an annunciation.

52. The method of claim 50 wherein the apparatus further comprises postage printing means controlled by the processor and a descending register indicative of an amount of postage available for printing, and wherein the first memory is nonvolatile, the method comprising the additional step of:

in the event of generation of the second selection signal after the receipt of the request signal, storing the descending register in the first memory within the second range of addresses;

whereby data contained in the descending register are protected from spurious processor write cycles.

53. The method of claim 50 wherein the apparatus further comprises a third address decoder responding to a predetermined address, and wherein the request signal comprises a read cycle for the predetermined address, and wherein the annunciating step further comprises annunciating in the protection circuit whether the second selection signal has been generated in the absence of receipt of the read cycle for the predetermined address.

54. The method of claim 53 wherein the apparatus further comprises postage printing means controlled by the processor and a descending register indicative of an amount of postage available for printing, and wherein the first memory is nonvolatile, the method comprising the additional step of:

in the event of generation of the second selection signal after the receipt of the read cycle for the predetermined address, storing the descending register in the first memory within the second range of addresses;

whereby data contained in the descending register are protected from spurious processor write cycles.

55. The method of claim 50 wherein the processor has a nonmaskable interrupt input terminal, and wherein the method comprises, after the step of annunciating in the protection circuit, the further step of:

annunciating to the processor the event of generation of the second selection signal in the absence of receipt of a request signal by generating a nonmaskable interrupt input signal.

56. The method of claim 55 wherein the apparatus further comprises postage printing means controlled by the processor and a descending register indicative of an amount of postage available for printing, and wherein the first memory is nonvolatile, the method comprising, before the addressing step, the additional step of:

storing the descending register in the first memory within the second range of addresses, whereby data contained in the descending register are protected from spurious processor write cycles.

57. The method of claim 55 wherein the apparatus further comprises a third address decoder responding to a predetermined address, and wherein the request signal comprises a read cycle for the predetermined address, and wherein the method further comprises, after the step of generating the second selection signal and before the step of annunciating in the protection circuit whether the second selection signal has been generated in the absence of receipt of a request signal, annunciating in the protection circuit the event of generation of the second selection signal in the absence of receipt of the read cycle for the predetermined address.

58. The method of claim 57 wherein the apparatus further comprises postage printing means controlled by the processor and a descending register indicative of an amount of postage available for printing; and wherein the first memory is nonvolatile, the method comprising, before the addressing step, the additional step of:

storing the descending register in the first memory within the second range of addresses, whereby data contained in the descending register are protected from spurious processor write cycles.

59. A method for protecting a memory region, said method for use with a data protection apparatus comprising a processor addressing an address space, at least one memory area comprising a first memory, a bus interconnecting the processor and said first memory, a first address decoder generating a first selection signal in response to addresses in a first range of said first memory selected by the processor, a second address decoder generating a second selection signal in response to addresses in a second range of addresses of said first memory selected by the processor, said second range of addresses being nonidentical to the first range of addresses and having at least one address in common with the first range, and a protection circuit operatively coupled to the processor to receive a request signal therefrom, the method comprising the steps of:

generating a request signal;

addressing an address in the second range of addresses during a write cycle;

generating the second selection signal in the second address decoder;

annunciating, by said protection circuit, the event of generation of the second selection signal in the absence of receipt of the request signal;

and writing to an address in the second range of addresses only in the absence of the protection circuit annunciation.

60. The method of claim 59 for use with the data protection apparatus, wherein the protection circuit of the apparatus comprises first and second bistable gates, said method further comprising, after the first generating step and before the addressing step, a step of setting the first bistable gate to a first state, and, after the second generating step and before the writing step, a step of clocking the second bistable gate.

61. The method of claim 59 wherein the apparatus further comprises a third address decoder responding to a predetermined address in said at least one memory area, and wherein the request signal comprises a read cycle for the predetermined address.

62. The method of claim 59 wherein the apparatus further comprises postage printing means controlled by the processor and a descending register indicative of an amount of postage available for printing; and wherein the first memory is nonvolatile; and wherein the step of writing to an address in the second range of addresses comprises storing the descending register within the second range of addresses, whereby data contained in the descending register are protected from spurious processor write cycles.

63. The method of claim 61 wherein the apparatus further comprises postage printing means controlled by the processor and a descending register indicative of an amount of postage available for printing; and wherein the first memory is nonvolatile, and wherein the step of writing to an address in the second range of addresses comprises storing the descending register within the second range of addresses, whereby data contained in the descending register are protected from spurious processor write cycles.

64. A method for use with a data protection apparatus comprising a processor, a memory device, a protection circuit operatively coupled to the processor to receive a request signal therefrom, and an address decoder generating a selection signal corresponding to a protected region of the memory device, the protected region comprising less than all of the addresses of the memory device, the method comprising the steps of:

addressing an address in the protected region of the memory device during a write cycle;

providing an output signal annunciating whether the request signal has been received by the protection circuit prior to the addressing step; and interrupting the processor if no request signal has been received prior to the addressing step.

* * * * *

UNITED STATES PATENT AND TRADEMARK OFFICE
CERTIFICATE OF CORRECTION

PATENT NO. :  5,559,992
DATED       :  September 24, 1996
INVENTOR(S) :  Peter Stutz It is certified that error appears in the above-identified patent and that said Letters Patent is hereby corrected as shown below:

Col. 10, line 58, "another a" should read --another--;

Col. 10, line 59, "flip-flip" should read --flip-flop--;

Col. 10, line 64, "flip-flip" should read --flip-flop--;

Col. 16, line 4, "claim 2" should read --claim 23--;

Col. 17, line 55, "levels" should read --level--.

Signed and Sealed this

Twenty-fifth Day of March, 1997

Attest:

BRUCE LEHMAN

Attesting Officer

Commissioner of Patents and Trademarks